United States Patent [19]

Kogure

[11] Patent Number: 5,412,643

[45] Date of Patent: May 2, 1995

[54] DUPLEX FIELD BUS SYSTEM

[75] Inventor: Makoto Kogure, Katsuta, Japan

[73] Assignee: Hitachi, Ltd., Tokyo, Japan

[21] Appl. No.: 860,079

[22] Filed: Mar. 30, 1992

[30] Foreign Application Priority Data

Mar. 29, 1991 [JP] Japan .................................. 3-065948

[51] Int. Cl.[6] .............................................. H04B 1/56
[52] U.S. Cl. ..................................... 370/24; 370/85.1;
370/16; 340/827; 371/8.1
[58] Field of Search ............ 370/24, 26, 16, 13,
370/11.1, 85.1, 29; 340/827, 825.01; 371/8.1,
8.2, 11.1, 11.2

[56] References Cited

U.S. PATENT DOCUMENTS

| | | | |
|---|---|---|---|
| 5,027,347 | 6/1991 | Malkki | 370/24 |
| 5,153,874 | 10/1992 | Kohno | 370/16 |
| 5,163,041 | 11/1992 | Moriyama | 370/16 |
| 5,200,949 | 4/1993 | Kobayashi | 370/16 |

*Primary Examiner*—Douglas W. Olms
*Assistant Examiner*—Dang Ton
*Attorney, Agent, or Firm*—Antonelli, Terry, Stout & Kraus

[57] ABSTRACT

A duplex field bus system in which a transmission is provided by first and second transmission lines. At least one of field device, an upper-rank apparatus and an external power supply is connected to both of the first and second transmission lines so that power supply and communication can be performed by using either one of or both of the transmission lines selectively. When failure is detected in the currently used one of the first and second transmission lines, not only is the failed transmission line switched over into the other one transmission line, but also information related to the occurrence of failure is transmitted to other devices before the communication is restarted. Accordingly, even in the case where fatal failure related to the transmission line occurs in the field bus system, communication can be continued by automatically switching the transmission line used by the devices.

13 Claims, 6 Drawing Sheets

DUPLEX FIELD BUS SYSTEM

BACKGROUND OF THE INVENTION

The present invention relates to a duplex field bus system and particularly relates to a duplex field bus system for easily maintaining high reliability in a multi-drop connection structure in which duplex transmission lines are constructed and a plurality of field devices are connected to each transmission line.

The so-called "field devices", in general, detect physical quantities such as pressure, temperature, flow rate and the like at respective points in various kinds of plants, and convert the values of the detected physical quantities into electric signals and transmit the electric signals to upper-rank apparatuses through transmission lines. On the other hand the devices also receive control signals transmitted from the upper-rank apparatuses, controlling valves or the like in plants. The transmission of electric signals such as measurement signals, control signals and the like in transmission lines are standardized in the case where the signals are analog signals. In this case, analog current signals of 4 to 20 mA are transmitted between the field devices and the upper-rank apparatuses. In the transmission lines between the field devices and the upper-rank apparatuses, heretofore, one-directional communication is generally made by analog signals.

In recent years, a field device containing a microprocessor has been developed with the advance of the semi-conductor integrated circuit technique and has been put into practical use. According to the field device, not only one-directional communication can be made by analog signals through a transmission line but two-way communication can be made by digital signals through a transmission line. Further, the field device has been developed so that the range setting of the field device, the self diagnosis thereof, and the like, can be instructed remotely by using the two-way communication. The devices as described above have been disclosed in JP-A-58-48198 and JP-A-59-201535.

A typical example of the conventional transmission system will be described specifically hereunder with reference to FIG. 6. FIG. 6 shows an example of the structure of analog current output type field devices which require an external power supply. Field devices 101a, 101b and 101c are operated by electric power supplied from an external power supply 103 through a transmission line 102, and generate analog current signals as constant-current sources for passing currents corresponding to the respectively detected physical quantities through the transmission line 102. An upper-rank reception apparatus 104 receives the analog current signals (hereinafter referred to as "analog signals") flowing in a resistor (not shown) connected in series with the transmission line 102, by detecting the signals as voltages across the opposite ends of the resistor, and uses the signals as instruction values given to the field devices 101a, 101b and 101c. An upper-rank communication device 105 is connected to a desired point between the field devices 101a, 101b and 101c and the reception apparatus 104 and the external power supply 103. The upper-rank communication device 105 communicates with the field devices by using digital signals through the two-way communication.

As for the signal transmission method in the transmission line, there is known a method in which digital signals are superimposed on analog signals to perform communication by digital signals so as not to influence the analog signals, another method in which analog signals and digital signals are switched with each other to transmit the analog signals or digital signals, and yet another method in which signals are transmitted by using digital signals without the use of analog signals, and the like.

Recently, there has been proposed a field bus system in which a plurality of field devices are connected onto one transmission line by means of a multidrop system to perform two-way communication with digital signals. A typical example of the structure of the field bus system will be described hereunder with reference to FIG. 7. FIG. 7 shows an example of the structure of a system in which a plurality of field devices are tree-like connected to upper-rank apparatuses through a transmission line. Field devices 111a, 111b and 111c are operated through electric power supplied from an external electric source 113 through a transmission line 112. The field devices make two-way communication with an upper-rank reception apparatus 114 with digital signals through the transmission line 112 successively, so that processes such as transmission of detected physical quantities, reception of control values, and the like, are made. An upper-rank communication device 115 is connected between the field devices 111a, 111b and 111c and the reception apparatus 114 and the external power supply 113 and makes two-way communication with the field devices with digital signals. Terminators 116 are constituted by a resistor and a capacitor connected in series with each other, and are connected to opposite ends of the transmission line 112.

In the case where the system is shifted from the conventional system in FIG. 6 to the field bus system in FIG. 7, the upper-rank devices and the field devices must be replaced by devices adapted for the field bus system. Because the transmission line 102, however, can be directly used as the transmission line 112, the system can be shifted easily. In the field bus system, the number of field devices connected to the transmission line 112 can be increased. Accordingly, the field bus system has an advantage in that the system can be extended easily.

In the aforementioned prior art technique, however, not only is the number of field devices connected to one transmission line increased when the system is shifted from the conventional system to the field bus system, but communication is made by digital signals as well. In this respect, the field bus system has no consideration in the point of view of reliability against noise in comparison with the conventional system. Further, the field bus system has a problem in that the field devices, which have been controlled periodically, cannot be controlled when communication error occurs frequently.

In particular, in the case of failure in the transmission line, electric power cannot be supplied to the field devices connected to the transmission line at all. There is no consideration given to the fact of that all the field devices cannot be operated.

Although a method of providing the field bus as a duplex field bus in total may be considered as a technique for improving reliability of the transmission line, there arises a problem in that there is no merit for shifting the system from the conventional system in the point of view of cost performance because all the devices are required for each transmission line.

SUMMARY OF THE INVENTION

Upon such circumstances, an object of the present invention is to provide a duplex field bus system in which devices, such as field devices, that are not provided as duplex devices are connected to transmission lines provided as duplex transmission lines, to give various virtual duplex functions to the devices to thereby easily provide a high reliable transmission system.

In addressing the foregoing object, the duplex field bus system according to a first aspect of the present invention is constituted by: at least one upper-rank apparatus and at least one external power supply which are provided on the control room side; at least one field device provided on the field side; and a transmission line for supplying operating electric power to the field device and for performing two-way communication between the upper-rank apparatus and the field device. In this construction, the transmission line is provided in the form of duplex transmission lines; and at least one of the upper-rank apparatus, the external power supply and the field device is connected to both of the duplex transmission lines and has a transmission line failure detecting/switching means for detecting failure occurring in the currently used one of the duplex transmission lines and for switching the failed one of the duplex transmission lines to the other one of the duplex transmission lines.

Like the aforementioned construction, the duplex field bus system according to a second aspect of the present invention is constituted by: at least one upper-rank apparatus and at least one external power supply which are provided on the control room side; at least one field device provided on the field side; and a transmission line for supplying operating electric power to the field device and for performing two-way communication between the upper-rank apparatus and the field device. In this construction: the transmission line is provided in the form of duplex transmission lines; the external power supply is provided for each of the duplex transmission lines; the upper-rank apparatus and the field device are connected to both of the duplex transmission lines; and each of the upper-rank apparatus and the field device has a communication means for performing two-way communication while using both of the duplex transmission lines at all times, and a transmission line failure detecting/switching means for detecting failure occurring in either one of the duplex transmission lines in an operating state in which operating electric power is supplied from the external power supply connected to one of the duplex transmission lines and for switching the failure one of the duplex transmission lines into the other normal one of the duplex transmission lines.

In the system according to each of the first and second aspects of the invention, the external power supply may be provided in the form of duplex external power supply respectively corresponding to the duplex transmission lines so that the duplex external electric sources are arranged separately in the field side and in the control room side; and a control function related to a predetermined operation is additionally given to the field device to perform self-regulation dispersive control.

In the system according to the second aspect of the invention, the duplex transmission lines are arranged so that both of the duplex transmission lines may be used simultaneously so that the duplex transmission lines can be used for failure diagnosis and any other purposes respectively.

By providing duplex transmission lines as described above, a reserve transmission cable as well as an original main transmission cable can be prepared. Improvement of reliability can be attained by using the duplex transmission lines effectively. In addition, the system can be constructed so that at least one field device can use one of the duplex transmission lines selectively or both of the duplex transmission line simultaneously in accordance with the purpose. Accordingly, devices such as a field device and the like can be operated as virtual duplex devices, so that it is unnecessary to provide devices such as field devices, upper-rank. apparatuses, external power supplies and the like for the transmission lines respectively.

In the duplex field bus system according to the present invention, devices such as a field device and the like are connected to both of the duplex transmission lines through individual connection ports. Because the duplex transmission lines are not connected to each other directly, the normal operation can be continued through switching the currently used one of the duplex transmission lines over into the other one of the duplex transmission lines even when failure occurs in the currently used transmission line to bring about a communication disabled state or a state in which operating power cannot be supplied to the field device. In particular, the operation on the safety side can be secured through switching the failure one of the duplex transmission lines over into the other normal one of the duplex transmission lines at the time of the occurrence of failure by providing a function of continuously diagnosing failure for each of the duplex transmission lines.

In particular, when the duplex transmission lines are provided separately in different paths, there is little possibility of the operating electric power not being supplied to the field device due to the entering of large noise simultaneously into both of the duplex transmission lines or further because both of the duplex transmission lines become into an open-loop state simultaneously. Accordingly, reliability can be improved more greatly.

Further, when processings such as diagnosis of the field device, checking of error in communication data, communication similar to that in the main transmission cable, and the like, are made by using the reserve transmission cable, processings related to improvement of reliability such as prediction of failure in the field device, improvement of reliability on communication data, improvement of communication throughput, and the like, can be attained.

DETAILED DESCRIPTION OF THE PREFERRED EMBODIMENTS

Embodiments of the present invention will be described hereunder with reference to the accompanying drawings.

Figure 1:
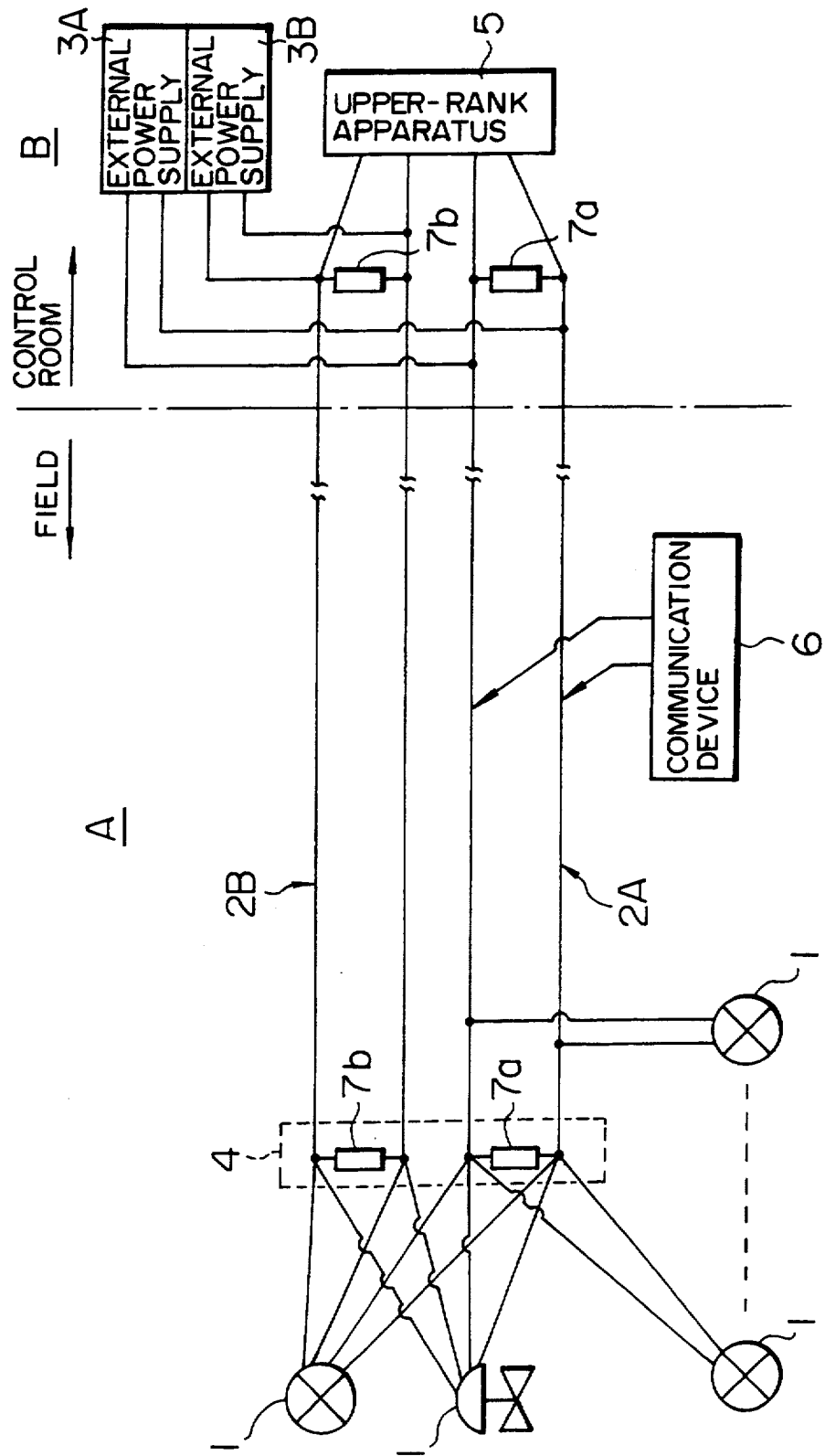
FIG. 1 is a block diagram of a first embodiment of the duplex field bus system according to the present invention.

FIG. 1 shows an example of the structure of a duplex field bus system according to the present invention. In FIG. 1, the section A represents a field, and the section B represents a control room. A plurality of field devices 1 are provided at predetermined positions in the field A. The field devices 1 contain detectors for detecting valves, physical quantities, etc. The field devices 1 make two-way serial communication by digital signals. Namely, the field devices 1 detect physical quantities, such as process pressure, temperature, flow rate, etc., in various types of plants and transmit the values of the detected physical quantities or receive control quantities of valves and the like. Each of the field devices 1 is connected to either one of duplex transmission lines 2A and 2B or to both of the duplex transmission lines 2A and 2B, so that the field device 1 is operated on the basis of electric power supplied, through the transmission lines 2A and 2B, from external power supply 3A and 3B provided in the control room B. For example, each of the transmission lines 2A and 2B is provided as a duplex transmission line constituted by a pair of transmission lines. For example, one transmission line 2A is used as a main transmission line, and the other transmission line 2B is used as a reserve transmission line. In practical use, a plurality of groups each constituted by a pair of main transmission cables (transmission line 2A) and a pair of reserve transmission cables (transmission line 2B) are provided in a main cable.

In this embodiment, three of the plurality of field devices 1 are connected to the duplex transmission lines 2A and 2B through a junction box (relay terminal panel) 4, and one of the field devices 1 is connected to an intermediate point of one transmission line 2A. More specifically, it is not necessary that a field device 1, which is not vital, always be connected to both of the two transmission lines 2A and 2B. On the contrary, though not shown, field devices of the same type may be connected to both the two transmission lines 2A and 2B, or operating electric power for driving the field devices may be supplied by any means of other transmission lines. Each of the field devices 1 connected to both the two transmission lines 2A and 2B has individual connection ports corresponding to the transmission lines. A desired number of field devices 1 can be connected to the transmission lines 2A and 2B. In this case, there arises a limitation in use about the lengths of the transmission lines 2A and 2B and the lengths of the lines between the junction box 4 and respective field devices 1, correspondingly to the number of the field devices 1.

An upper-rank apparatus 5 is provided in the control room B. The upper-rank apparatus 5 has a function of communicating with the respective field devices 1 by using digital signals through either one of the transmission lines 2A and 2B to receive physical quantities (pressure, temperature, flow rate, etc.) detected by the field devices 1, transmitting control signals to the field devices 1 such as valves and the like as plant control information. Like the field devices 1, the upper-rank apparatus 5 is not always provided for each of the transmission lines 2A and 2B but must have individual connection ports corresponding to the respective transmission lines.

The external power supply 3A and 3B supply operating electric power to the field devices 1 through the two transmission lines 2A and 2B, respectively. In this case, impedance in a communication frequency band is set to a large value by any means, for example, by connecting an inductor to the power supply, in series, in order to reduce influence on communication signals. Although description has been made upon the case where two external power supplies 3A and 3B are provided for the two transmission lines 2A and 2B, it is not always necessary to provide two external power supplies respectively for the two transmission lines 2A and 2B. In the case where electric power can be supplied from one external power supply to the two transmission lines, it is necessary to provide individual connection ports corresponding to the transmission lines.

An upper-rank communication device 6 is connected to a desired point of either or each of the transmission lines 2A and 2B. The upper-rank communication device 6 can perform processes, such as monitoring of output values from the field devices 1, adjustment thereof, etc., on the basis of communications through the transmission lines by operating a display or keyboard provided in the upper-rank communication device 6. Further, the upper-rank communication device 6 can be removed from the transmission lines 2A and 2B. Even in the case where the communication protocol used is of the token passing type in which communication is made sequentially, the upper-rank communication device 6 can interrupt the communication to make yet another communication.

Terminators 7a and 7b are connected to the respective opposite end portions of the transmission lines 2A and 2B. Each of the terminators 7a and 7b is constituted by a resistor and a capacitor connected in series with each other. Impedance in each of the terminators 7a and 7b is set to a considerably smaller value than the input impedance in the communication frequency band of the field devices 1, the upper-rank apparatus 5 and the upper-rank communication device 6 connected on the transmission lines 2A and 2B, in order to reduce the influence, which is induced by various conditions, such as device connection point, the number of devices, etc., on communication signals. Accordingly, when either one of the terminators is disconnected from a corresponding transmission line, impedance in the communication frequency band, of the transmission line seen from the respective field device is doubly increased, as follows. In the case where transmission signals from the respective field devices are of the current drive type, the signals received as signal voltages are doubled. On the contrary, when the number of devices connected to the transmission lines is increased, impedance in the communication frequency band of the transmission line seen from the respective device is decreased so that the voltages of the signals decrease. Therefore, it is necessary that each device has a wide range for allowing reception of signals. This is a factor causing narrowing of the margin of noise and lowering of reliability on communication.

The respective operations of the field device 1, the upper-rank apparatus 5 and the upper-rank communication device 6 in the aforementioned configuration will be described hereunder.

With respect to the communicating operations of the respective devices, in general, communication is made periodically through the transmission line 2A by using information of physical quantities, valve control quantities and the like, as data. The period of the communication is kept constant, except in the case where interrupt communication is made by connecting the upper-rank communication device 6 to the transmission line 2A and the case where communication error arises because of production of noise exceeding the noise margin. Accordingly, in the case where communication error occurs frequently or in the case where a communication disabled state is continued for a long time, the transmission line used by each device is instantaneously switched from the transmission line 2A to the transmission line 2B on the basis of an instruction of a device taking the initiative in communication among the devices connected to the field bus, in order to avoid system failure. This switching operation is also applied to the case where failure occurs in electric power supplied to the respective field devices 1 through the transmission line 2A. Because operating electric power can be continuously supplied to devices such as field devices 1 and an upper-rank apparatus 5 connected to the two transmission lines 2A and 2B by instantaneously detecting transmission line failure and switching the used transmission line, the devices can be operated continuously.

In the construction of the aforementioned embodiment, communication can be made continuously through the switching operation without disorder of the field bus communication period unless failure occurs simultaneously in the two transmission lines, even in the case where failure in entering of noise into the transmission line or in interruption of supply of operating electric power to the field devices 1 occurs in the transmission lines 2A and 2B. Because the system can be constructed even in the case where other portions than the transmission lines are not provided as duplex portions, a highly reliable system can be realized easily. Accordingly, there arises an effect in cost performance.

A self diagnosis device may be provided in each of the devices so that recognition related to reliability of signals communicated through transmission line can be made in the two transmission lines on the basis of an instruction periodically transmitted by itself or on the basis of an instruction given from the outside in order to previously recognize failure in the transmission line not used. Because failure in the respective devices can be recognized by this method before failure occurs in the two transmission lines, the operating disabled state of the field devices 1 can be prevented.

Figure 2:
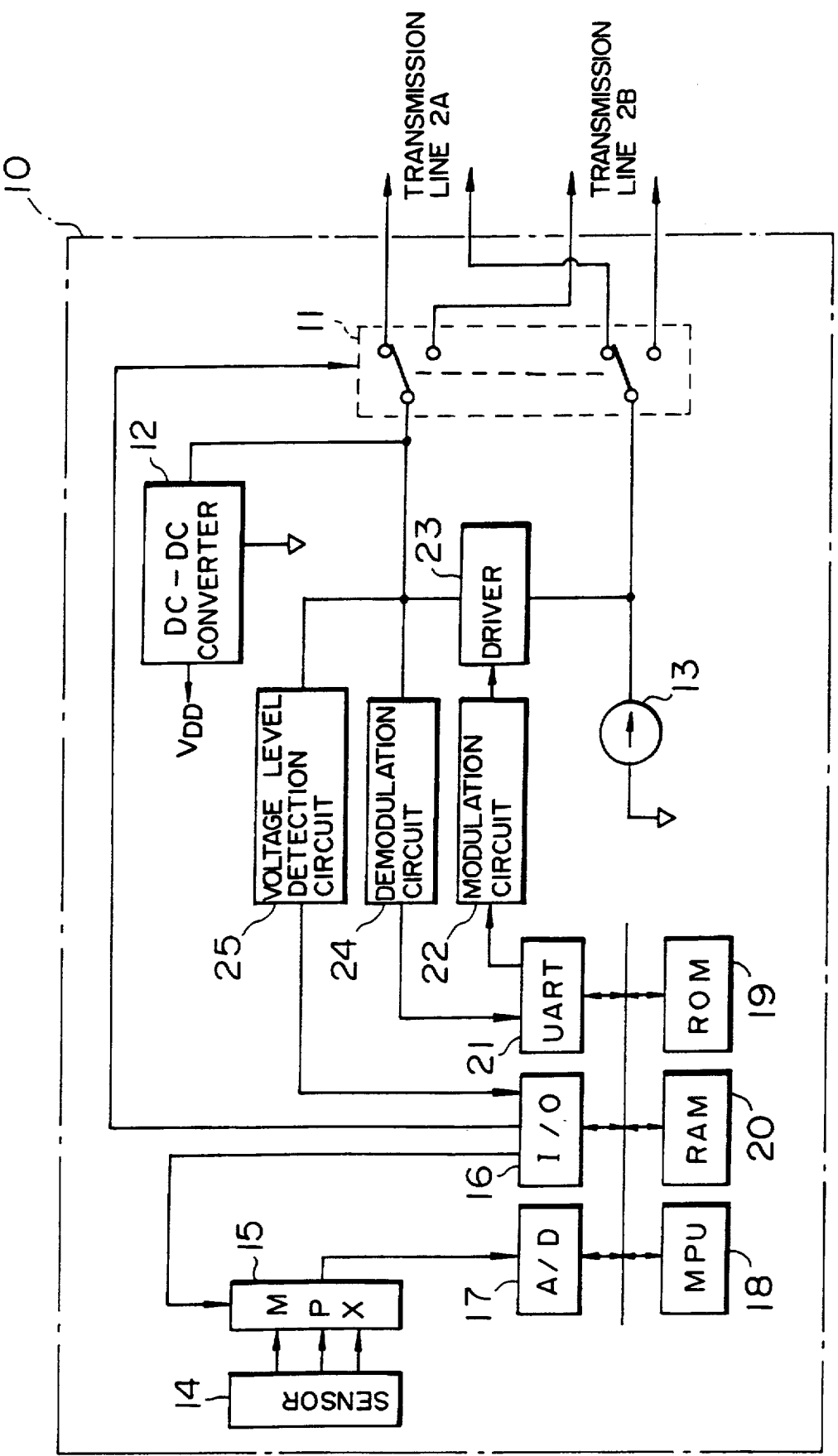
FIG. 2 is a block diagram of internal circuits in a field device in the first embodiment of the present invention.

The internal construction and operation of a differential pressure transmitter 10 as a typical example of the field device 1 used in the aforementioned embodiment will be described hereunder with reference to FIG. 2.

In the differential pressure transmitter 10, internal circuits and duplex transmission lines 2A and 2B are connected to each other through a changeover switching portion 11. In FIG. 2, the changeover switching portion 11 is connected to the transmission line 2A. The reference numeral 12 designates a DC-DC converter producing a voltage $V_{DD}$ for operating the internal circuits of the differential pressure transmitter 10 on the basis of the voltage given by the external power supply 3A through the transmission line 2A. A constant-current circuit 13 controls the internal circuits to make the total current consumed by the internal circuits constant.

Accordingly, the total current consumed in the differential pressure transmitter 10 takes a value obtained by adding the current used for a communication signal to the constant current consumed by the internal circuits.

The detailed structure and operation of the internal circuits of the differential pressure transmitter 10 will be described hereunder. Respective output signals of differential pressure, static pressure, temperature and the like from a composite sensor 14 are supplied to a multiplexer (MPX) 15. An input switching signal from an I/O interface 16 is supplied to the multiplexer 15. When the multiplexer 15 receives the input switching signal, an input signal is selected and output on the basis of the input switching signal. The output signal from the multiplexer 15 is supplied to an A/D converter 17 in which the signal is converted into a digital signal. Further, this signal is corrected by a correction arithmetic operation of a microprocessor (MPU) 18 on the basis of the output signals successively given from the A/D converter 17 and various coefficients stored in an ROM 19 and an RAM 20, so that a true value of the signal is calculated and stored in the RAM 20.

Communication in the differential pressure transmitter 10 is made as follows.

With respect to the transmitting operation, first, data stored in the RAM 20 are output as a serial data signal train from a transmission/reception circuit (UART) 21 on the basis of an instruction given by the microprocessor 18. This signal is input into a driver 23 after it is modulated as a predetermined modulation signal by a modulation circuit 22. This signal is output from the driver 23 to the transmission line 2A through the changeover switch 11, as a communication signal. Examples of the modulating method used herein include a frequency modulation method in which the signal is modulated by two kinds of frequencies corresponding to the two values "1" and "0" of the digital signal, and a method in which the signal is converted into Manchester codes of the base-band signal. Examples of the driver method include a method in which the signal is output as a voltage signal, and a method in which the signal is output as a current signal.

With respect to the receiving operation, the communication signal (modulated by the aforementioned modulating method) from the transmission line 2A is picked out as a serial digital signal train through the changeover switch 11 after it is demodulated by a demodulation circuit 24. This signal is supplied to the transmission/reception circuit 21, as data constituted by the two values "1" and "0" of the digital signal. The signal 21 input to the transmission/reception circuit 21 is picked out as reception data by the microprocessor 18.

A voltage level detection circuit 25 is connected in parallel to the demodulation circuit 24. The voltage level detection circuit 25 detects the line voltage in the transmission line 2A. When the detected voltage is out of a predetermined range, a failure signal is supplied to the I/O interface 16 to report the occurrence of failure. The microprocessor 18 recognizes the occurrence of failure through the I/O interface 16 and gives a changeover instruction to the changeover switch 11 through the I/O interface 16. The transmission line used in the differential pressure transmitter 10 is switched from 2A to 2B by the switching operation. Thereafter, a signal expressing the occurrence of failure in the transmission line 2A is transmitted to the other field devices 1 and the upper-rank apparatus 5. To achieve the aforementioned operation, the microprocessor 18 has transmission line failure detecting/switching means for detecting failure in the transmission line and for changing-over the changeover switch 11 on the basis of the detection, and the ROM 19 has a program stored in advance to be used for the transmission line failure detecting/switching means.

Examples of the case where the transmission line is switched on the basis of the detection of the failure signal include a case where communication error occurs frequently because of excessive noise entering into the transmission line, and a case where a communication disabled state is continued for a long time. In these cases, a signal for reporting the occurrence of failure is transmitted to the other devices before the transmission line is switched. Because most factors contributing to the occurrence of communication error are temporary, substantial failure can be detected as the target failure if the transmission line is switched only when communication error is detected continuously.

As described above, in general, the operation of the field device 1 can be continued through instantaneously switching the currently used transmission line to the other, reserve transmission line when various types of failures occur. Accordingly, there arises an effect that duplex processes can be made virtually to improve the reliability thereof.

Further, in the case where the currently used transmission line is switched in the respective device connected to the two transmission lines 2A and 2B, synchronization between devices is made by simultaneously switching the transmission line used in another device through reporting the occurrence of failure to other devices on the basis of the communication signal or through temporarily reducing the input impedance to the transmission line at the changing-over time to reduce the line voltage in the transmission line.

Although the aforementioned embodiment has shown the case where the transmission lines 2A and 2B are generally provided in one path, that is, one main cable, the invention can be applied to the case where the transmission lines 2A and 2B are provided separately in different paths. In the case where the transmission lines 2A and 2B are provided separately in different paths, the system can be improved more greatly in reliability because it is rarely considered that operating electric power cannot be supplied to the field device 1 through the entering of large noise simultaneously into the transmission lines 2A and 2B or through the setting of the transmission lines 2A and 2B simultaneously to an open-loop state. It is particularly preferable that the transmission line prepared as a reserve transmission line is provided in a noiseless environment.

Another embodiment of the present invention will be described hereunder with reference to FIGS. 3 and 4.

Figure 3:
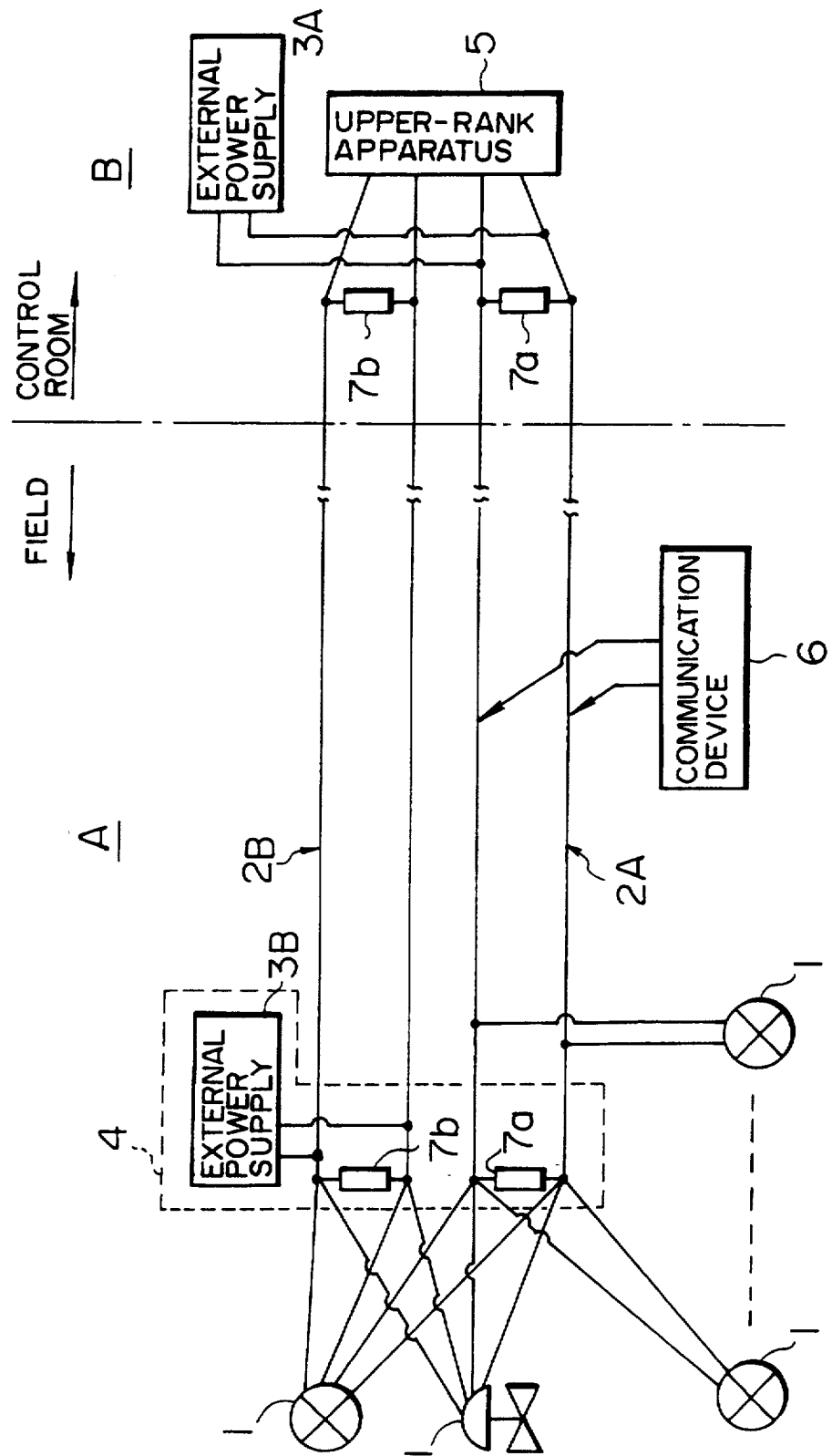
FIG. 3 is a block diagram of a second embodiment of the duplex field bus system according to the present invention.
Figure 4:
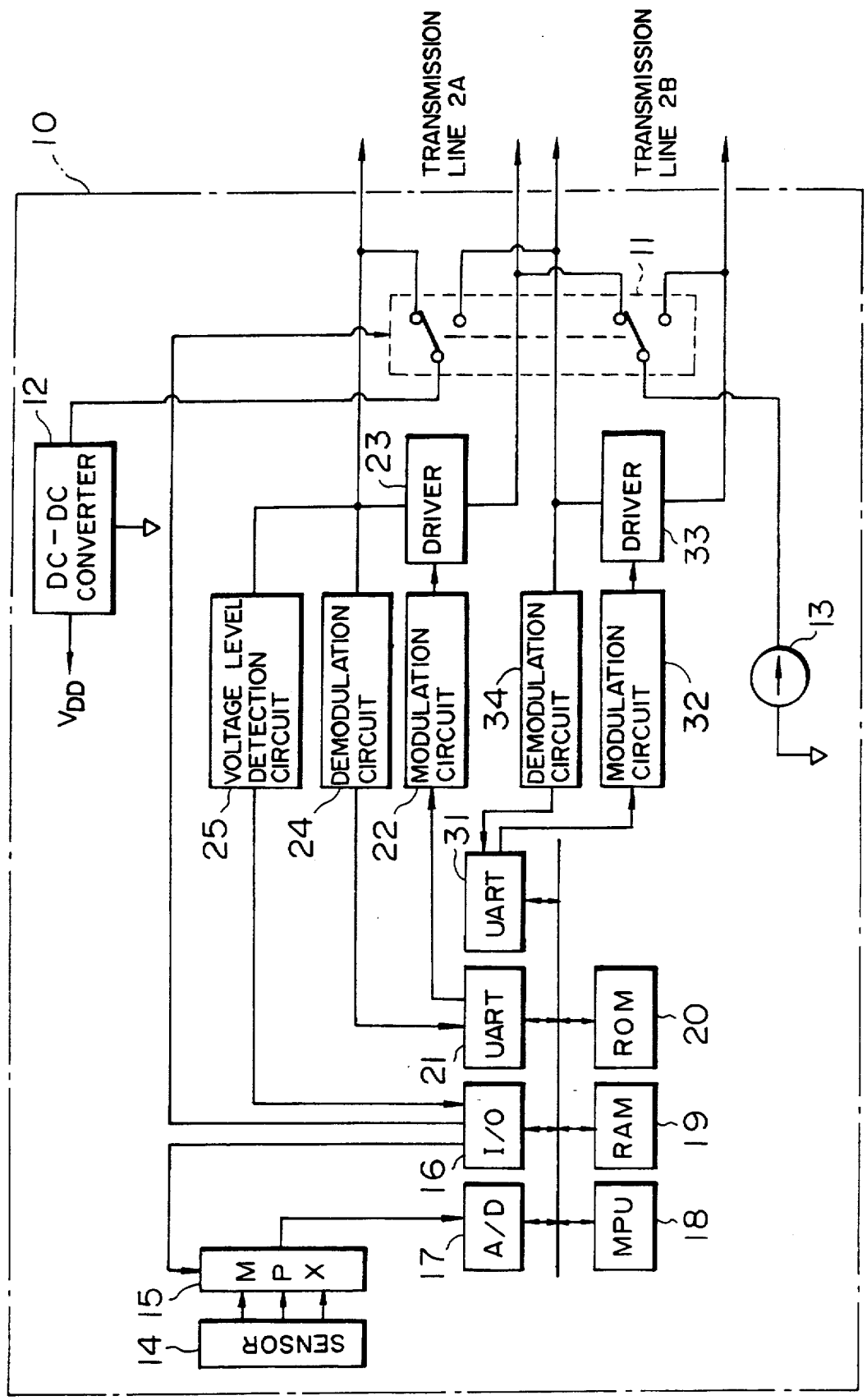
FIG. 4 is a block diagram of internal circuits in a field device in the second embodiment of the present invention.

FIG. 3 is substantially equivalent to FIG. 1. Namely, the construction of the system in FIG. 3 is the same as that in FIG. 1, except that the external power supply 3B in FIG. 3 is provided in the field-A side junction box 4, Accordingly, like numerals refer to like parts.

Because the external power supply 3B is provided in the field-A side junction box 4, operating electric power can be supplied from the external power supply 3B provided in the function box 4 to the respective field devices even in the case where the two transmission lines 2A and 2B are made simultaneously in an open-loop state through the cutting-off of the main cable containing the transmission lines 2A and 2B or through the disconnecting of a connector. More specifically, even in the case where the transmission line 2A currently used is made in an open-loop state through the cutting-off of the transmission line 2A or through the disconnecting of a connector, the operations of the respective field devices 1 can be continued because the external power supply 3B provided on the transmission line 2B side can be used by switching the transmission line 2A over the transmission line 2B through detecting the openloop state of the transmission line 2A in the respective field devices 1. Further, even in the case where the transmission line 2B currently used is cut off at a point in the front of the junction box 4, power supply for operating the field devices is not stopped because the external power supply 3B is provided at the point of the field side junction box 4.

On the other hand, for communication, the terminator 7b is provided in the outside of the transmission line 2B. In this state of the terminator 7b, impedance in the communication frequency band, of the transmission line seen from the field devices 1 is doubled. As the impedance increases, the communication signal becomes larger. The communication signal is however in an acceptable reception range of the respective field devices, so that there is no trouble in communication.

Accordingly, if the system is constructed so as to contain a self-regulation function for performing control processes such as detection of physical quantities (pressure, temperature, flow rate, etc.), execution of a control arithmetic operation, control of valves and the like, there arises an effect that the operation of the system can be continued without any influence on plants even in the case where the aforementioned fatal failure occurs. Further, in the aforementioned function, there arises an effect that processes such as initialization of various apparatuses in the field devices 1, reconsideration of optimum control conditions and the like can be made at the time of the starting-up of the system by using the upper-rank communication device 6 without connection of apparatuses in the chamber to the transmission lines.

A specific example of the internal circuits of the field device in this embodiment will be described hereunder with reference to FIG. 4. The construction of the internal circuits shown in FIG. 4 is the same as that of the internal circuits shown in FIG. 2, except the structure and operation related to communication. Accordingly, in each of FIGS. 2 and 4, like numerals refer to like parts. In the field device 1, two groups, each constituted by a transmission/reception circuit, a modulation circuit, a demodulation circuit and a driver, are provided in the transmission lines 2A and 2B, respectively. Namely, a transmission/reception circuit 31, a modulation circuit 32, a demodulation circuit 34 and a driver 33 are additionally provided for the transmission line 2B. In this structure, transmitting/receiving operations can be carried out simultaneously through the two transmission lines 2A and 2B. In addition to the aforementioned function in the first embodiment, various functions related to improvement of reliability, improvement of communication processing capacity and the like can be provided systematically. Like the first embodiment, this embodiment shows the case where the field device 1 is applied to a differential pressure transmitter 10.

With respect to the operation of communication between devices such as field devices 1 and the like, information of physical quantities, valve control quantities and the like can be communicated as data by using the two transmission lines 2A and 2B in an ordinary state.

The transmission line to be used is selected at random, so that the transmitting or receiving device answers by using the same transmission line. In the case where communication error occurs frequently or in the case where a communication disabled state is continued for a long time, communication is made through limiting the transmission line used by the respective devices to the normal transmission line on the basis of an instruction of the device taking the initiative in communication among the devices connected to the field bus, in order to avoid system failure. Accordingly, the operations of the respective devices can be continued without stopping communication.

In the aforementioned construction of the system, the two transmission lines can be used at all times. Accordingly, the throughput of the system can be improved, so that a system suitable for high-speed control can be provided. Further, communication can be made at a constant period even in the case where the number of field devices connected to one field bus is increased.

When the system is constructed so that the same data is transmitted to the two transmission lines 2A and 2B for the purpose of checking an error on the basis of comparison between data received from the two transmission lines 2A and 2B, the state of the transmission lines 2A and 2B can be diagnosed. Accordingly, reliability on communication data can be improved greatly. The diagnosis of failure in the transmission lines 2A and 2B can be made periodically on the basis of an instruction generated from the inside of the respective devices or on the basis of an instruction given from the outside upper-rank device.

In another construction, one of the transmission lines 2A and 2B may be used for control and the other may be used for maintenance. In this case, failure in the field devices can be predicted on the basis of the self diagnosis of the field devices, the altering of set data, and the like. As a result, reliability of the field devices can be improved.

In the aforementioned embodiments, the field device side and the upper-rank device side may be electrically isolated from each other by the junction box 4. As a result, operating electric power can be supplied to the respective field devices even in the case where the main cable is short-circuited.

Figure 5:
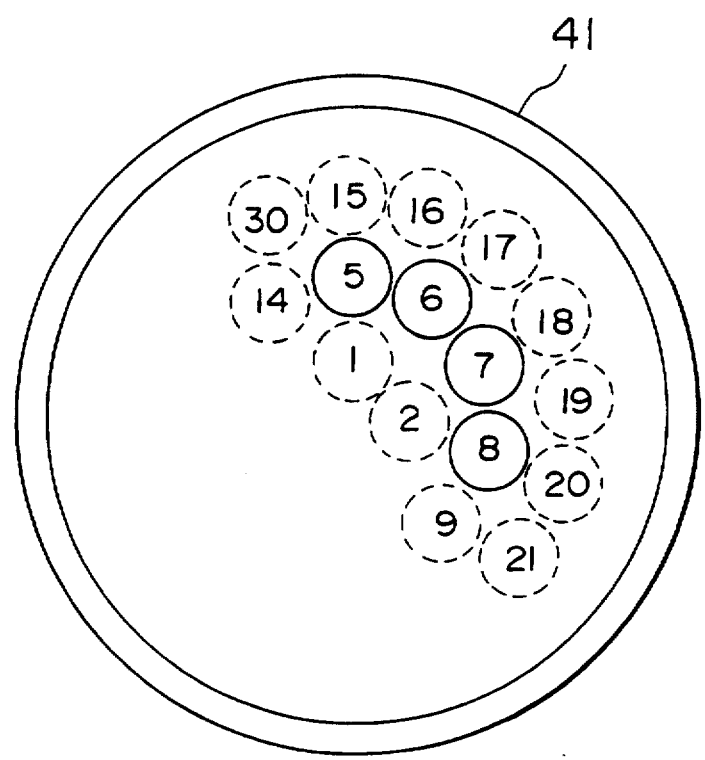
FIG. 5 is a sectional view of bundle of lines for explaining a method of using parallel cables according to the present invention.
Figure 6:
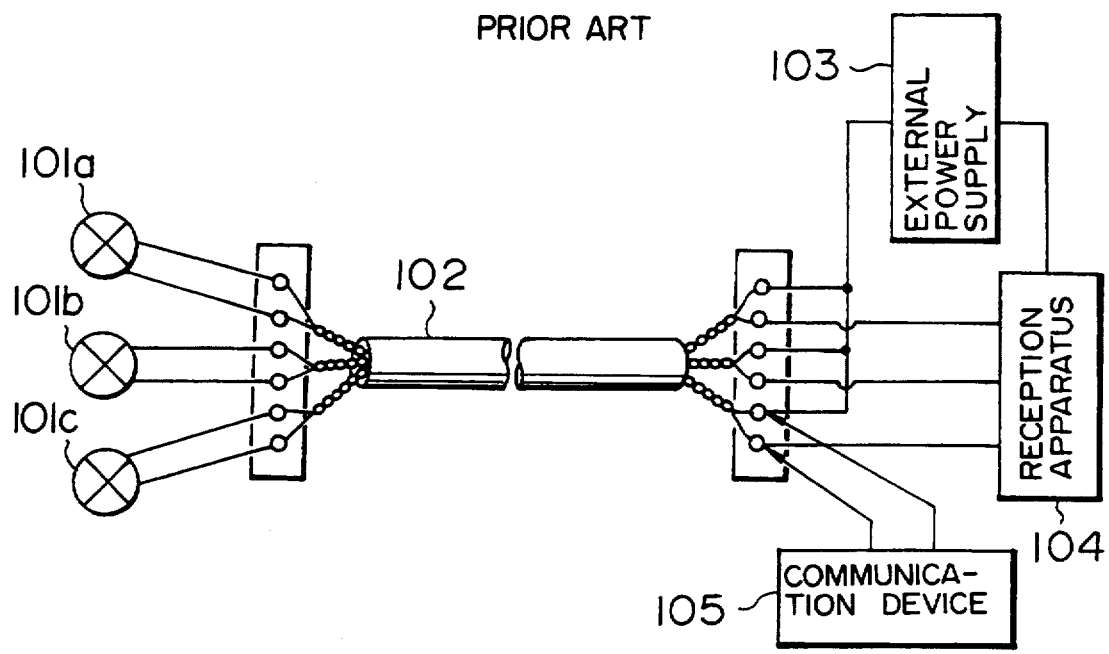
FIG. 6 is a block diagram of a conventional system for explaining the conventional system.
Figure 7:
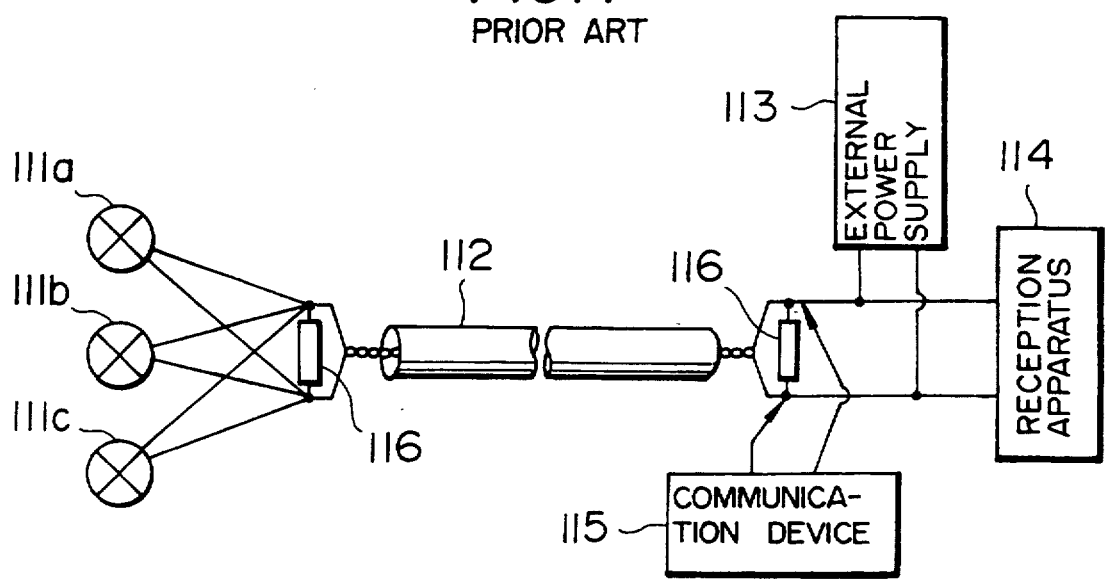
FIG. 7 is a block diagram of another conventional system for explaining another conventional system.

An embodiment related to the usage of the transmission lines will be described hereunder with reference to FIG. 5.

Pairs of stranded cables are used as the field bus transmission line. In the case where the system is shifted from a conventional system to the field bus system, parallel cables may be used so that the conventional wiring can be used as it is. Because parallel cables in a range of 2 to about 50 cables are mainly used generally and because bundle of cables 41 are numbered in order of starting from the center layer thereof as shown in FIG. 5, the cables are selected so that adjacent cables of the same layer in radial layers can be used. Further, the parallel cables are large in crosstalk between transmission lines, so that there is a limit to in the length of the transmission line allowed to be used. Therefore, in this embodiment, for example, continuous numbers 5 to 8 are used as shown in FIG. 5. The inner numbers 6 and 7 are assigned to the main line (transmission line 2A), and the outer numbers 5 and 8 are assigned to the reserve line (transmission line 2B). This prevents the influence of crosstalk from the cables of the numbers 9 and 14 in the same layer onto the main cable. Further, because the directions of currents flowing in a pair of transmission cables are opposite to each other and because adjacent cables are used as a pair, crosstalk from cables lines of adjacent layers is canceled totally. Accordingly, in this embodiment, influence of crosstalk can be reduced even in the. case where parallel cables are used as the transmission lines 2A and 2B. Accordingly, not only can reliability of transmission data can improved but the length of the transmission line allowed to be used can be extended as well.

As is obvious from above description, the following effects can be provided by the present invention.

Because duplex transmission lines are used, reliability of the system can be improved even in the case where one transmission line is used for the double purpose of supplying electric power to a plurality of field devices and performing communication.

Further, because the device such as a field device can be constructed by providing an interface portion connected to either or both of transmission lines, it is not necessary to provide field devices for respective transmission lines. Accordingly, a simple and low-cost system can be provided.

Further, the reliability on communication, the reliability on the field devices, the throughput of communication and the like can be improved by using the two transmission lines effectively. In addition, a self-regulation function can be provided on the field device side. Accordingly, the field devices can be operated at the time of the starting-up thereof even in the case where failure occurs in the upper-rank device.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A duplex field bus system having at least one field device provided in a field and at least one upper-rank apparatus for transmitting signals to said field device and receiving signals from said device, said duplex field bus system comprising:
   a first transmission line connected between said at least one upper-rank apparatus and said at least one field device, for providing communication between said at least one upper-rank apparatus and said at least one field device;
   a first power supply connected to said first transmission line for supplying electric power to said at least one field device;
   a second transmission line connected between said at least one upper-rank apparatus and said at least one field device for also providing communication between said at least one upper-rank apparatus and said at least one field device;
   a second power supply connected to said second transmission line for supplying electric power to said at least one field device; and
   transmission line failure detecting/switching means, disposed in said at least one field device, for selecting one of said first and second transmission lines for detecting failure in said selected transmission line and for switching said selected transmission line into the other of said first and second transmission lines when failure is detected in said selected transmission line.

2. A duplex field bus system according to claim 1, wherein said transmission line failure detecting/switching means has a function of diagnosing each of said first and second transmission lines on the basis of an instruction periodically generated by itself or an instruction given from the other device.

3. A duplex field bus system according to claim 1, wherein said transmission line failure detecting/switching means has means for detecting failure in line voltage in each of said first and second transmission lines, and means for switching said selected transmission line into the other transmission lines of said first and second transmission lines on the basis of the detection of failure.

4. A duplex field bus system according to claim 1, further comprising other field devices connected to said first and second transmission lines, wherein said at least one field device has a reporting means for informing said other field devices of the switching between said first and second transmission lines by temporarily changing input impedance when said selected transmission line is switched into the other transmission line of said first and second transmission lines.

5. A duplex field bus system according to claim 1, wherein one of said first and second power supplies is disposed in a control room in which said at least one upper-rank apparatus is disposed, the other of said first and second power supplies being disposed in a field in which said one field device is disposed.

6. A duplex field bus system according to claim 5, wherein said other power supply disposed in said field is provided in a junction box.

7. A duplex field bus system according to claim 6, wherein said field and said control room are electrically isolated from each other in said junction box.

8. A duplex field bus system according to claim 5, wherein a plurality of field devices are disposed in said field, connected to said first and second transmission lines, a control means is provided for performing dispersive control by using the other power supply disposed in said field while performing self-regulation between said field devices provided in said field.

9. A duplex field bus system according to claim 3, wherein said field device has means for transmitting a failure signal to either one of said transmission lines just after or before said selected transmission line is switched.

10. A duplex field bus system according to claim 1, wherein each of said upper-rank apparatus and said field device has means for transmitting the same signal to both of said first and second transmission lines, and means for comparing signals respectively received from said first and second transmission lines with each other.

11. A duplex field bus system according to claim 1, wherein each of said upper-rank apparatus and said field device uses both of said first and second transmission lines while assigning said first and second transmission lines to a control line and a maintenance line respectively, and has a control means for using one of said first and second transmission lines in common to control and maintenance at the time of the occurrence of failure.

12. A duplex field bus system according to claim 1, wherein a bundle of cables formed by arranging adjacently a plurality of parallel cable groups each including a pair of main transmission cables and a pair of reserve transmission cables are used as said first and second transmission lines so that said reserve transmission cable are arranged in both outer sides.

13. A duplex field bus system according to claim 1, wherein said first and second transmission lines are provided separately in different wiring paths.

* * * * *